(12) United States Patent
Kim (10) Patent No.: US 10,940,670 B2
(45) Date of Patent: Mar. 9, 2021

(54) AEROGEL COMPOSITE AND METHOD FOR PREPARING SAME

(71) Applicant: SKC CO., LTD., Suwon-si (KR)

(72) Inventor: Hyun-Chol Kim, Seoul (KR)

(73) Assignee: SKC CO., LTD., Suwon-si (KR)

( * ) Notice: Subject to any disclaimer, the term of this patent is extended or adjusted under 35 U.S.C. 154(b) by 0 days.

(21) Appl. No.: 15/570,568

(22) PCT Filed: Feb. 3, 2017

(86) PCT No.: PCT/KR2017/001215
§ 371 (c)(1),
(2) Date: Oct. 30, 2017

(87) PCT Pub. No.: WO2017/135752
PCT Pub. Date: Aug. 10, 2017

(65) Prior Publication Data
US 2018/0326700 A1    Nov. 15, 2018

(30) Foreign Application Priority Data
Feb. 5, 2016    (KR) ........................ 10-2016-0014993

(51) Int. Cl.
*B32B 5/28*     (2006.01)
*B32B 38/08*    (2006.01)
(Continued)

(52) U.S. Cl.
CPC .............. *B32B 5/28* (2013.01); *B29C 70/305* (2013.01); *B32B 5/24* (2013.01); *B32B 37/02* (2013.01);
(Continued)

(58) Field of Classification Search
CPC .......... B32B 5/28; B32B 38/08; B32B 37/02; B32B 38/10; B32B 38/162; B32B 43/006;
(Continued)

(56) References Cited

U.S. PATENT DOCUMENTS 6,364,953 B1    4/2002  Kawakami et al.
7,635,411 B2 *  12/2009 Rouanet ................... B32B 5/02
                                                    106/600

(Continued)

FOREIGN PATENT DOCUMENTS

CN    104911901 A    9/2015
CN    104944887 A    9/2015
(Continued)

OTHER PUBLICATIONS

European Patent Office; Communication dated Jun. 5, 2018 in counterpart application No. 17747797.3.
(Continued)

*Primary Examiner* — Matthew J Daniels
*Assistant Examiner* — Shibin Liang
(74) *Attorney, Agent, or Firm* — Sughrue Mion, PLLC (57) ABSTRACT

A method of preparing an aerogel composite, which includes a wetting pretreatment step for suppressing the generation of air bubbles in a fibrous material such as a mat, and a step of impregnating the fibrous material with a precursor by injecting the precursor in a vessel under a reduced pressure. The method provides a high quality, high insulation aerogel-impregnated composite without air bubbles.

18 Claims, 4 Drawing Sheets

(51) Int. Cl.
*B32B 38/10* (2006.01)
*B32B 38/00* (2006.01)
*C01B 33/158* (2006.01)
*B32B 5/24* (2006.01)
*B29C 70/30* (2006.01)
*B32B 37/02* (2006.01)
*B32B 38/16* (2006.01)
*B32B 43/00* (2006.01)

(52) U.S. Cl.
CPC ............. *B32B 38/08* (2013.01); *B32B 38/10* (2013.01); *B32B 38/162* (2013.01); *B32B 38/164* (2013.01); *B32B 43/006* (2013.01); *C01B 33/1585* (2013.01); *B32B 2038/0056* (2013.01); *B32B 2307/304* (2013.01)

(58) Field of Classification Search
CPC ......... B32B 38/164; B32B 2038/0056; B32B 2307/304; B29C 70/30; B29C 70/305; C01B 33/158; C01B 33/1585; B06B 1/02; B01J 13/00; C08K 3/08
See application file for complete search history.

(56) References Cited

U.S. PATENT DOCUMENTS

| | | | | |
|---|---|---|---|---|
| 9,115,025 | B2* | 8/2015 | Bauer | .................. C04B 14/064 |
| 2002/0061396 | A1* | 5/2002 | White | .................. B29C 70/12 |
| | | | | 428/293.4 |
| 2005/0046086 | A1* | 3/2005 | Lee | .................. B01J 13/0091 |
| | | | | 264/444 |
| 2012/0025127 | A1 | 2/2012 | Yeo et al. | |
| 2012/0231251 | A1* | 9/2012 | Kim | .................. C08K 3/346 |
| | | | | 428/219 |
| 2013/0106008 | A1 | 5/2013 | Ahn et al. | |
| 2014/0127490 | A1* | 5/2014 | Islam | .................. B82Y 30/00 |
| | | | | 428/219 |
| 2016/0333572 | A1* | 11/2016 | Samanta | .................. E04B 1/78 |
| 2019/0002356 | A1* | 1/2019 | Hebalkar | ............. D04H 1/4218 |
| 2019/0062517 | A1* | 2/2019 | Steiner, III | .................. C08J 9/28 |

FOREIGN PATENT DOCUMENTS

| | | |
|---|---|---|
| CN | 104961494 A | 10/2015 |
| JP | 4905814 B2 | 3/2012 |
| KR | 2001-0029792 A | 4/2001 |
| KR | 10-0849927 B1 | 8/2008 |
| KR | 10-2011-0082379 A | 7/2011 |
| KR | 10-1047965 B1 | 7/2011 |
| KR | 10-2012-0020924 A | 3/2012 |
| KR | 10-1187568 B1 | 10/2012 |
| KR | 10-1515803 B1 | 5/2015 |
| KR | 10-1654795 B1 | 9/2016 |

OTHER PUBLICATIONS

Taiwanese Patent Office; Communication dated Nov. 7, 2017 in counterpart application No. 106103665.
International Search Report for PCT/KR2017/001215, dated Jun. 14, 2017.

* cited by examiner

AEROGEL COMPOSITE AND METHOD FOR PREPARING SAME

TECHNICAL FIELD

An aerogel composite and a method of preparing same.

BACKGROUND ART

An aerogel is the lightest solid developed by mankind and an ultra-insulating material having a porosity of greater than about 95%. The aerogel is a new material that has attracted attention as future insulation and soundproofing materials, and, thus, various types of research have recently been carried out to widely utilize the aerogel in various industrial fields. In general, an aerogel has low density, an open cell structure, a large surface area, and a nanoscale pore size. For example, the aerogel exhibits a density of up to 0.01 g/cc to 0.3 g/cc and an excellent thermal insulation property having a thermal conductivity of 10 mW/mK to 15 mW/mK at about 37° C. (100° F.) and atmospheric pressure.

Metal alkoxide, silica, silicon carbide, or alumina is known as a material for an inorganic aerogel. Also, urethane, resorcinol-formaldehyde, or polyimide is known as a material for an organic aerogel. Among these materials, the silica aerogel is a nanostructure material having a high specific surface area, high porosity, low density, low permittivity, and excellent thermal insulation, wherein lots of research into production and characterization of the silica aerogel has been conducted. For example, in order to improve mechanical strength and thermal insulation performance of the silica aerogel, there was an attempt to prepare an aerogel composite (see Korean Patent Laid-open Publication No. 2011-0082379).

Figure 3:
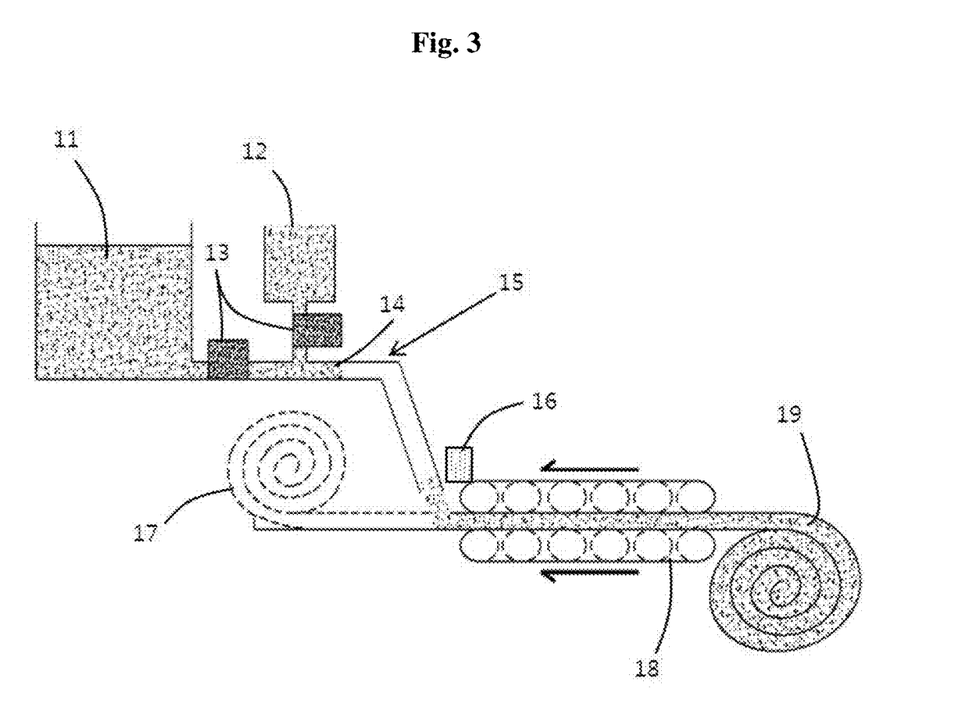
FIG. 3 illustrates a process of preparing a gel sheet by using a conventional rotary conveyor belt.

Furthermore, in order to improve processability for preparing the aerogel, there was an attempt to use belt conveyor impregnation (see Korean Patent No. 1133025, FIG. 3). However, in such conventional belt conveyor impregnation method, appropriate viscosity is required to prevent a flow loss of a precursor. Since the impregnation of the aerogel having high viscosity causes air bubbles in the aerogel, which in turn may cause performance degradation. In order to address the above limitation, sufficient transport time may be required for reducing the air bubbles and achieving uniform impregnation. However, in such case, because a length of a conveyor belt is consequently increased and burrs generated by a process of pressing with a roller must be removed, productivity may be reduced. Also, in the belt conveyor impregnation method, gelation must be achieved to a certain level, i.e., the aerogel may be rolled while a reaction occurs during transport. But, that sufficient gelation time required for the formation of nanopores having high quality may not be provided.

Furthermore, according to the conventional method, since the precursor is insufficient or is non-uniform even in the case that the viscosity of the precursor is reduced and the impregnation is performed, in which the precursor must be further added to an aging tank to supplement a deficient gel. In this case, since the produced aerogel may be partially exfoliated and scattered in the form of powder, there may be a difficulty in its application and performance quality may be reduced.

DISCLOSURE OF INVENTION

Thus, an object of the present invention is to provide an aerogel composite which has improved thermal insulation performance and is easily prepared, and a method of preparing the same.

A method of preparing an aerogel composite according to an embodiment includes: wetting a fibrous material including at least one of inorganic fibers and organic fibers; winding the wetted fibrous material with a separator in a roll form or laminating the wetted fibrous material with the separator in a planar form; charging the fibrous material into a vessel; preparing a gel-fiber composite by injecting a precursor into the vessel and gelating the precursor while removing residual air bubbles under vacuum; taking out the gel-fiber composite from the vessel and removing the separator; solvent substituting and organically surface-modifying the gel-fiber composite; and atmospheric pressure drying or supercritical drying the organically surface-modified gel-fiber composite.

Further, a method of preparing an aerogel composite according to another embodiment includes: providing a fibrous material including at least one of inorganic fibers and organic fibers; wetting the fibrous material; charging the wetted fibrous material into a vessel; impregnating the fibrous material with a precursor by injecting the precursor into the vessel after reducing a pressure in the vessel; preparing a gel-fiber composite by gelation of the precursor; substituting a solvent included in a gel of the gel-fiber composite and organically modifying an inner surface of the gel; and drying the gel-fiber composite.

An aerogel composite according to an embodiment includes: a fibrous material including at least one of inorganic fibers and organic fibers; and an aerogel disposed in the fibrous material, wherein, in a cutting surface of the aerogel composite, the number of pores having a diameter of 10 μm to 5 mm in an area of 1,500 mm$^2$ is 10 or less.

The method of preparing an aerogel composite according to the embodiment includes a wetting pretreatment step for suppressing the generation of the air bubbles in the fibrous material such as a mat. Thus, the preparation method according to the embodiment may provide a high quality, high insulation aerogel-impregnated composite without air bubbles.

Also, in the method of preparing an aerogel composite according to the embodiment, the precursor is injected into the vessel and the fibrous material is impregnated with the precursor under a reduced pressure. Thus, the preparation method according to the embodiment may quickly and uniformly impregnate the fibrous material with the precursor, and, thereafter, since a sufficient gelation aging process is performed. Thus, a high insulation aerogel composite having uniform nanopores formed therein may be provided.

Particularly, the fibrous material in the form of a mat and the separator are laminated, the laminate may then be charged into the vessel in a roll form, and, thereafter, the precursor is injected into the vessel under a reduced pressure. The fibrous material is impregnated with the injected precursor under a reduced pressure. Thus, the fibrous material may be uniformly and quickly impregnated with the precursor without air bubbles.

In case that the fibrous material is charged into a vessel in the roll form, an aerogel composite may be easily prepared in large quantities. Also, during a process of gelation of the precursor impregnated into the fibrous material, the separator may suppress a phenomenon that the fibrous materials stick to each other. That is, the method of preparing an aerogel composite according to the embodiment may mass-produce the aerogel composite in a roll form by using the separator.

Also, after the fibrous material is impregnated with the precursor, air bubbles in the fibrous material may be sufficiently removed by further reducing the pressure in the vessel.

Thus, the aerogel composite according to the embodiment hardly has pores having a diameter of a few μm or more. Specifically, in a cutting surface of the aerogel composite, the number of pores having a diameter of 10 μm to 5 mm in an area of 1,500 mm$^2$ may be 10 or less, 5 or less, 3 or less, or 2 or less.

Therefore, since the aerogel composite according to the embodiment hardly has pores having a diameter of a few μm or more, the aerogel composite may have an improved thermal insulation performance.

DESCRIPTION OF THE SYMBOLS

1-1: mat, 1-2: roller, 1-3: wetting agent, 1-4: spray device, 1-5: storage tank, 1-6: separator, 1-7: roll mat, 1-8: flat mat, 2-1: mat, 2-2: impregnation roller, 2-3: wetting agent, 2-4: drawing roller, 2-5: separator, 2-6: roll mat, 3-1: precursor, 3-2: supply line, 3-3: vessel, 3-4: exhaust line, 3-5: vacuum pump, 4-1: precursor, 4-2: supply line, 4-3: vessel, 4-4: exhaust line, 4-5: vacuum pump, 5-1: precursor, 5-2: supply line, 5-3: vessel, 5-4: exhaust line, 5-5: vacuum pump, 11: sol precursor solution, 12: gelation-promoting catalyst, 13: flow control device, 14: stationary mixer, 15: location where sol is mixed with a catalyst, 16: scraper, 17: fibrous material, 18: conveyor belt, 19: roll mat.

BEST MODE FOR CARRYING OUT THE INVENTION

A method of preparing an aerogel composite according to an embodiment comprises the steps of: wetting a fibrous material including at least one of inorganic fibers and organic fibers; winding the wetted fibrous material with a separator in a roll form or laminating the wetted fibrous material with the separator in a planar form; charging the fibrous material into a vessel; preparing a gel-fiber composite by injecting a precursor into the vessel and gelating the precursor while removing residual air bubbles under vacuum; taking out the gel-fiber composite from the vessel and removing the separator; solvent substituting and organically surface-modifying the gel-fiber composite; and atmospheric pressure drying or supercritical drying the organically surface-modified gel-fiber composite.

A method of preparing an aerogel composite according to another embodiment includes the steps of: providing a fibrous material including at least one of inorganic fibers and organic fibers; wetting the fibrous material; charging the wetted fibrous material into a vessel; impregnating the fibrous material with a precursor by injecting the precursor into the vessel after reducing a pressure in the vessel; preparing a gel-fiber composite by gelation of the precursor; substituting a solvent included in a gel of the gel-fiber composite and organically modifying an inner surface of the gel; and drying the gel-fiber composite.

Hereinafter, each step will be described in more detail.

According to the preparation method according to the embodiment, a fibrous material is provided first.

The fibrous material may be in the form of a mat. For example, the fibrous material may be a woven mat or a nonwoven mat.

The fibrous material may include inorganic fibers or organic fibers, or may include both thereof.

The inorganic fibers may include at least one selected from the group consisting of glass fibers, glass wool, rock wool, ceramic wool, and boron fibers; and the organic fibers may include at least one selected from the group consisting of nylon, aramid fibers, carbon fibers, polypropylene fibers, polyethylene fibers, polyester fibers, polyurethane fibers, acrylic fibers, polyvinyl chloride acetate fibers, rayon fibers, regenerated fibers, and waste fibers, but not limited thereto. Further, other special fibers or common fibers, such as cotton or linen, used in daily life may be used.

A diameter of the inorganic fibers and the organic fibers may be in a range of about 0.01 μm to 100 μm, for example, about 0.1 μm to 10 μm. A length of the each of the inorganic fibers and the organic fibers may be in a range of about 1 mm to 100 mm, for example, about 0.5 mm to 50 mm.

Thereafter, the fibrous material is wetted.

When a precursor sol is injected into the fibrous material, air bubbles may be generated due to surface tension of the inorganic fibers or the organic fibers. But, since surfaces of the fibers are wetted in advance, the generation of the air bubbles due to the surface tension may be suppressed.

The wetting may be performed by using any one or more of an acid, a water-soluble solvent, and a surfactant as a wetting agent.

For example, the wetting may be performed by using at least one wetting agent selected from (i) at least one acid selected from the group consisting of sulfuric acid, nitric acid, hydrochloric acid, acetic acid, and hydrofluoric acid in a pH range of 1 to 5; (ii) at least one water-soluble solvent selected from the group consisting of C1-C4 alcohol, acetone, ethylene glycol, glycol ethers, dimethylformamide (DMF), and tetrahydrofuran (THF); and (iii) at least one surfactant selected from the group consisting of sodium fatty acid, sodium alkylbenzenesulfonic acid, linear alkylbenzene sulfonate (LAS), polyacrylamide, polyoxyethylene alkylamine, dialkyldimethyl ammonium salt, alkylbenzylmethyl ammonium salt, polyoxyethylene alkyl ether, fatty acid sorbitan ester, fatty acid diethanolamine, alkylmonoglyceryl ether, alkyl sulfobetaine, and alkyl carboxybetaine.

For example, the wetting may be performed by using an acid as a wetting agent.

A detailed wetting method using an acid may be changed depending on types of fibers.

As a specific example, tens to hundreds of fine strands are braided and bonded in a single glass fiber, and, accordingly, strength of the fiber may be increased. But, since solid heat transfer may occur due to the agglomeration of the fine strands, an adhesive may be removed with an acid to loosen the braided strands.

As a result, since nanoporosity is achieved by allowing a precursor to impregnate into the fine strands of the glass fibers, a thermal insulation effect may be maximized. Also, since surfaces of the glass fibers are activated to be in a wet state, a hydrogel may be formed without air bubbles during the impregnation with the precursor.

The acid may have a pH range of 1 to 5 or 2 to 3. The acid may be sulfuric acid, nitric acid, hydrochloric acid, acetic acid, or hydrofluoric acid, but not limited thereto.

A concentration of the acid may be in a range of 0.1 wt % to 10 wt % or 0.2 wt % to 3 wt %.

As another example, the wetting may be performed by using a water-soluble solvent as a wetting agent. The water-soluble solvent may include C1-C4 alcohol, acetone, ethylene glycol, glycol ethers, dimethylformamide (DMF), and tetrahydrofuran (THF), but not limited thereto. The water-soluble solvent is not particularly limited as long as it is a solvent having good miscibility with water.

As another example, the wetting may be performed by using a surfactant as a wetting agent, and, accordingly, the generation of the air bubbles may be suppressed.

The surfactant may include an anionic surfactant such as sodium fatty acid, sodium alkylbenzenesulfonic acid, linear alkylbenzene sulfonate (LAS), and polyacrylamide; a cationic surfactant such as polyoxyethylene alkylamine, dialkyldimethyl ammonium salt, and alkylbenzylmethyl ammonium salt; a nonionic surfactant such as polyoxyethylene alkyl ether, fatty acid sorbitan ester, fatty acid diethanolamine, and alkylmonoglyceryl ether; and an amphoteric surfactant such as alkyl sulfobetaine and alkyl carboxybetaine.

A concentration of the surfactant may be in a range of 0.1 wt % to 10 wt %, 0.1 wt % to 5 wt %, 0.2 wt % to 3 wt %, or 0.5 wt % to 2 wt %.

After the completion of the wetting, the fibrous material is charged into the vessel.

According to the embodiment, a separator may be inserted into the wetted fibrous material before the wetted fibrous material is charged into the vessel, and the separator may be removed after the gel-fiber composite is prepared.

For this purpose, the fibrous material after the wetting may first be wound with the separator in a roll form or may be laminated with the separator in a planar form. For example, the separator may be wound with the wetted fibrous material in a roll form. Also, the separator and the wetted fibrous material may be alternately stacked.

The separator may be formed by treating a material, which is selected from the group consisting of stainless steel, a rubber membrane, a magnesium sheet, an aluminum sheet, polyvinyl chloride (PVC), polyethylene (PE), polyester, polypropylene (PP), polystyrene (PS), nylon, and a mixture material thereof, to allow a fluid to penetrate and permeate thereinto.

For example, in case that the fibrous material is a mat, the fibrous material may be prepared in the form of a roll mat, wherein the fibrous material is wrapped in several layers with the separator, or in the form of a flat mat wherein the fibrous material is stacked with the separator to have a planar form.

Figure 1A:
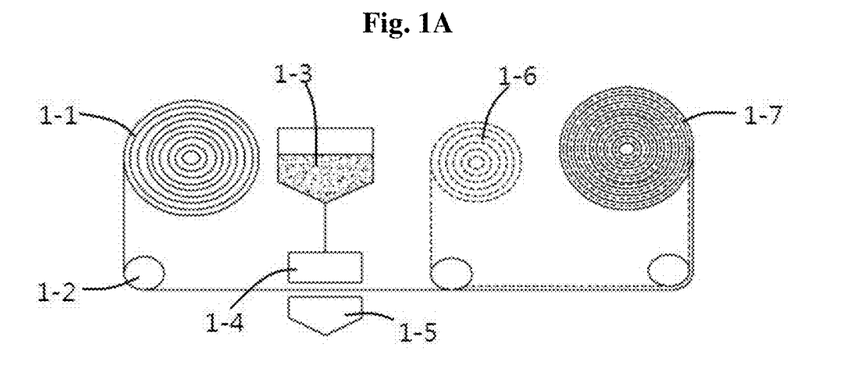
FIG. 1A illustrates a process of preparing a roll mat through wetting by spraying a wetting agent.
Figure 1B:
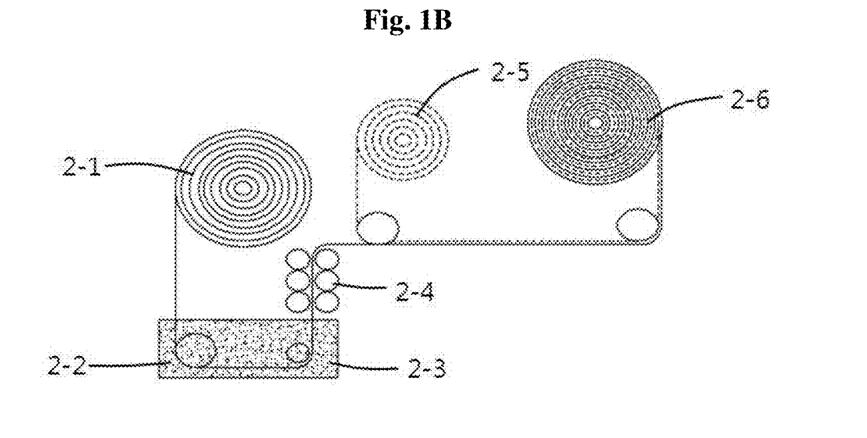
FIG. 1B illustrates a process of preparing a roll mat through wetting by impregnation with a wetting agent.
Figure 1C:
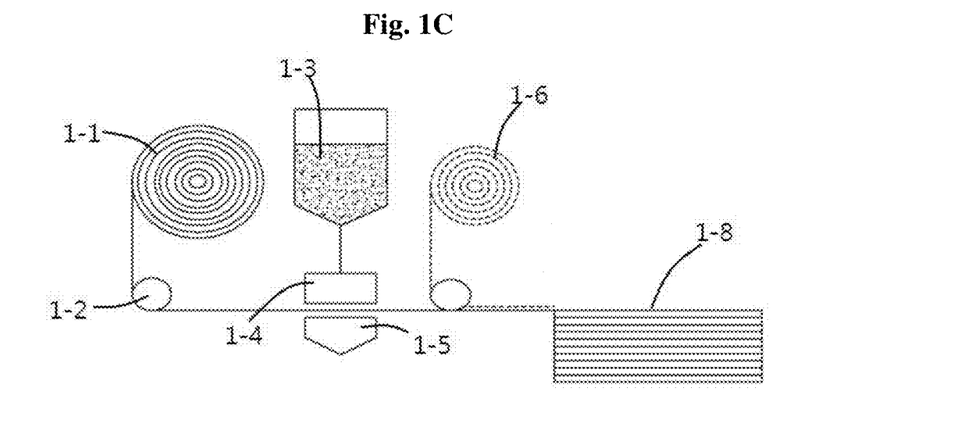
FIG. 1C illustrates a process of preparing a flat mat through wetting by spraying a wetting agent.

FIGS. 1A and 1B, respectively, illustrate processes of preparing a roll mat through wetting by spraying and impregnation with a wetting agent, and FIG. 1C illustrates a process of preparing a flat mat through wetting by spraying a wetting agent.

For example, as illustrated in FIG. 1A, a mat 1-1 is transported by a roller 1-2, a remaining wetting agent 1-3 is contained in a storage tank 1-5 while the wetting agent 1-3 is sprayed onto the mat by a spray device 1-4, and the mat may be wound with a separator 1-6 to prepare a roll mat 1-7.

As another example, as illustrated in FIG. 1B, after a mat 2-1 is transported by an impregnation roller 2-2 and impregnated with a wetting agent 2-3, the mat is compressed while a residual wetting agent is removed by a drawing roller 2-4, and the mat may be wound with a separator 2-5 to prepare a roll mat 2-6.

As another example, as illustrated in FIG. 1C, a mat 1-1 is transported by a roller 1-2, a remaining wetting agent 1-3 is contained in a storage tank 1-5 while the wetting agent 1-3 is sprayed onto the mat by a spray device 1-4, and the mat may be stacked with the separator 1-6 to prepare a flat mat 1-8.

According to the above-described methods, different from a conventional conveyor system, the impregnation of a sol may be sufficiently performed and the duration for winding or laminating the fibrous material with the separator may not limited.

Also, the spraying of the wetting agent and the removal of the remaining wetting agent may be simultaneously and instantaneously performed and a large amount of the mat may be wetted in a short period of time.

The wound or laminated fibrous material is charged into at least one vessel. Thereafter, a gel-fiber composite is prepared by injecting a precursor into the vessel and gelating the precursor while removing the residual air bubbles under vacuum.

For example, the horizontal or vertical roll mats or flat mats subjected to the wetting are charged into the vessel and impregnated with the precursor by injecting the precursor, and, are gelated.

Figure 2A:
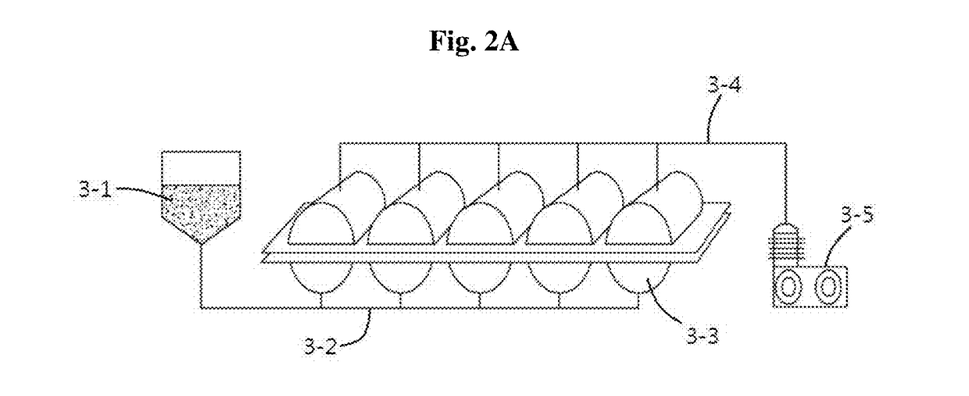
FIG. 2A illustrates a process of impregnating a horizontal roll mat with a precursor.
Figure 2B:
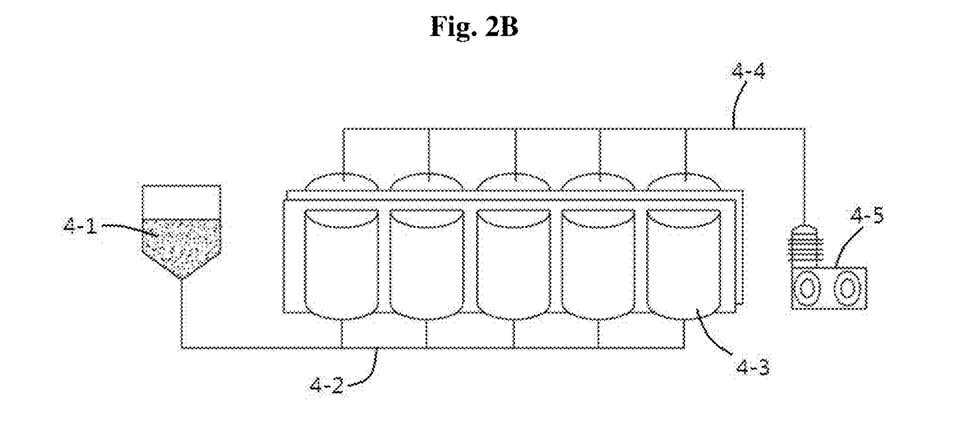
FIG. 2B illustrates a process of impregnating a vertical roll mat with a precursor.
Figure 2C:
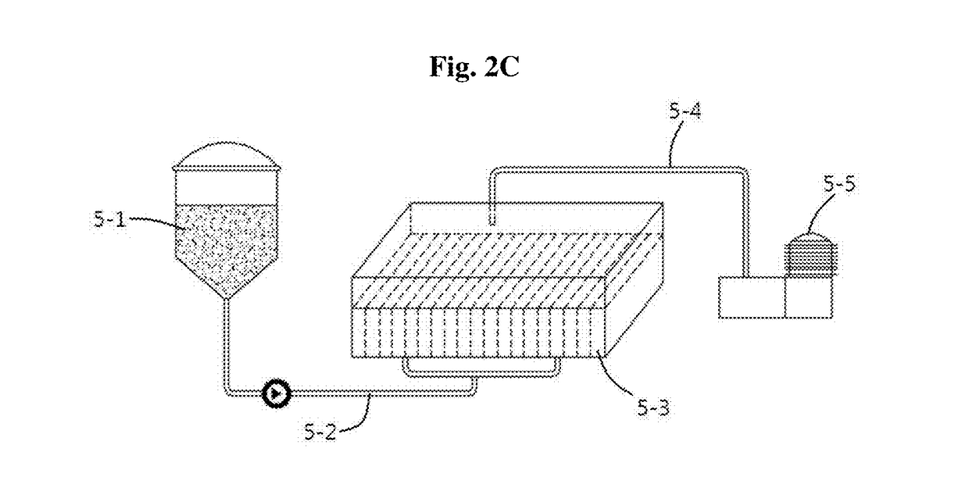
FIG. 2C illustrates a process of impregnating a flat mat with a precursor.

FIGS. 2A and 2B, respectively, illustrate processes of impregnating the horizontal roll mat and the vertical roll mat with the precursor, and FIG. 2C illustrates a process of impregnating the flat mat with the precursor.

For example, as illustrated in FIGS. 2A to 2C, the horizontal/vertical roll mats and flat mat are, respectively, charged into vessels 3-3, 4-3, and 5-3, the insides of the vessels are decompressed by exhaust lines 3-4, 4-4, and 5-4 and vacuum pumps 3-5, 4-5, and 5-5, and thereafter, precursors 3-1, 4-1, and 5-1 may be injected into the vessels through supply lines 3-2, 4-2, and 5-2.

The precursor may be a sol of sodium silicate, potassium silicate, or lithium silicate in a pH range of 3 to 7, or may be tetraethoxysilane (TEOS) hydrolyzed by an acid catalyst. The precursor may be sufficiently gelated and aged in a pH range of 4 to 6, and high-quality nanopores may be formed in the inside thereof.

Also, a low viscosity of about 5 cP to about 30 cP of the precursor is more advantageous for dense gelation without external loss or air bubbles.

Particularly, it is desirable to use a precursor comprising water having a relatively low vapor pressure, as a solvent (dispersion medium), with the sol of sodium silicate, potassium silicate, or lithium silicate, as the above precursor, because the pressure in the vessel may be effectively reduced.

For example, the solvent may include water, and, in this case, the pressure in the vessel may be in a range of 0.001 Torr to 10 Torr before the fibrous material is impregnated with the precursor. Also, after the impregnation of the fibrous material with the precursor, a step of reducing the pressure in the vessel may be further included, and, in this case, the pressure in the vessel may be reduced to a range of 0.001 Torr to 10 Torr.

As a specific example, the injection of the precursor and the gelation process may be performed by the following procedure.

First, the pressure in the vessel is reduced, and, specifically, the pressure in the vessel may be reduced to a range of about 0.001 Torr to about 100 Torr, about 0.001 Torr to about 10 Torr, or about 0.001 Torr to about 1 Torr.

Thereafter, the precursor is injected into the vessel, and, in this case, since the vessel is in a decompressed state, the precursor may be automatically injected by a pressure difference. The precursor may be injected from a bottom of the vessel and may be injected at an appropriate rate so that air bubbles may not be generated in the fibrous material.

Even after the precursor is injected, the pressure in the vessel may be continuously reduced, and, specifically, the pressure in the vessel may be reduced to a range of about 0.001 Torr to about 100 Torr, about 0.001 Torr to about 10 Torr, or about 0.001 Torr to about 1 Torr. Accordingly, the air bubbles in the fibrous material may be completely removed.

Thereafter, the precursor is gelated and aged, and, the pressure in the vessel may also be maintained as described above.

The prepared gel-fiber composite is taken out from the vessel and the separator is removed. Thereafter, the gel-fiber composite having the separator removed therefrom is solvent substituted, organically surface modified, and washed.

For example, in case that a sodium silicate sol is used as a precursor, a salt is removed by washing the gel-fiber composite with hot water several times, substitution by an organic solvent and organic surface modification may be performed and then the gel fiber composite is washed. In case that an alkoxide is used as the precursor, washing may be performed after substitution by an organic solvent and organic surface modification without the removal of the salt.

The organic solvent substitution may be performed by using C1-C8 alcohols; ketones such as acetone; or aromatic solvents such as toluene and xylene.

Also, as a treatment agent for the organic surface modification, for example, silanes such as trimethylchlorosilane (TMCS), hexamethyldisilazane (HMDS), dimethylchlorosilane (DMCS), and methyltrichlorosilane (MTCS), may be used.

However, in case that these silanes are only used, since a water-repellent maintenance period is not long, these silanes may be decomposed over time to cause the reduction of water repellency, and, accordingly, moisture may penetrate to deteriorate thermal conductivity.

Thus, it is desirable to introduce alkoxysilane having a relatively long water-repellent maintenance period into the organic surface modification together.

For example, the use of a mixture of silane and alkoxysilane as the treatment agent for the organic surface modification may be more advantageous in terms of the pore retention during drying and the increase in lifetime.

In this case, the silane may be hexamethyldisilazane (HMDS) or trimethylchlorosilane (TMCS).

Also, the alkoxysilane may have a formula of R—Si—(OR')$_3$, wherein R may be C1-C8 alkyl, phenyl, epoxy, amino, benzyl, aminochloropropyl, disulphido, isocyanate, epoxymelamine, mercapto, methacrylate, tetrasulphido, ureido, vinyl, or vinylbenzylamino, and R' may be methoxy, ethoxy, or acetoxy. The R group of the alkoxysilane may provide adhesion to other additive materials, and, for example, may provide adhesion to a sheet of a plastic material such as polyethylene, polyethylene terephthalate, polypropylene, polyvinyl chloride, nylon, and ethylene vinyl acetate, which may be used as a finishing material of the mat. Specific examples of the alkoxysilane may be tetramethoxysilane, tetraethoxysilane, methyltrimethoxysilane (MTMS), and ethyltrimethoxysilane (ETMS).

Furthermore, a mixing ratio by weight of the silane to the alkoxysilane may be in a range of 1:0.01 to 1:0.3, and the ratio may be appropriately adjusted according to a type of an organic group of the alkoxy.

Also, the treatment agent for the organic surface modification may further include an opacifying agent, and, for example, may further include $Al_2O_3$, $Fe_2O_3$, $TiO_2$, carbon, graphite, SiC, and a boron compound. The opacifying agent, for example, may have a particle diameter of 0.01 μm to 100 μm, particularly, 0.1 μm to 10 μm, and may be included in an amount of 1 part by weight to 10 parts by weight, particularly, 3 parts by weight to 7 parts by weight, based on 100 parts by weight of the organic surface modification treatment agent.

The gel-fiber composite obtained after the completion of the organic surface modification may be further subjected to a washing step. The washing may be performed by using alcohols such as n-butanol; or aromatic solvents such as toluene and xylene.

Thereafter, the gel-fiber composite is subjected to atmospheric pressure drying or supercritical drying. The atmospheric pressure drying may be performed at 60° C. for 1 hour or 250° C. for 2 hours, and the supercritical drying is not particularly limited, but may be performed at about 100 atm.

The method of preparing an aerogel composite according to the embodiment may be used in the manufacture of an aerogel mat.

Specifically, the aerogel mat may be manufactured by a method including: wetting a mat in advance and winding the mat with a separator in a multilayer roll form or laminating the mat with the separator to prepare a plurality of roll mats or flat mats; charging the plurality of roll mats or flat mats into a vessel and injecting a precursor to undergo sufficient gelation and aging period; and taking out the plurality of roll mats or flat mats from the vessel and removing the separator.

As a result, since productivity of the high-quality aerogel mat having uniform nanopores formed therein may be significantly improved, the high-quality aerogel mat may be mass-produced.

An aerogel composite according to an embodiment includes: a fibrous material including at least one of inorganic fibers and organic fibers; and an aerogel disposed in the fibrous material, wherein, in a cutting surface of the aerogel composite, the number of pores having a diameter of 10 μm to 5 mm in an area of 1,500 mm$^2$ is 10 or less.

The aerogel composite may be prepared by the above-described preparation method according to the embodiment.

For example, the aerogel may be formed from a sol of sodium silicate, potassium silicate, or lithium silicate.

Also, the sol of the sodium silicate, potassium silicate, or lithium silicate is impregnated into the fibrous material under vacuum and gelated, and the aerogel may then be prepared by solvent substitution and organic modification of an inner surface of the gel.

Since the fibrous material is densely impregnated with the precursor in the preparation process, the fibrous material may be densely filled with the aerogel. Thus, the aerogel composite according to the embodiment hardly has pores having a diameter of several μm or more.

For example, in a cutting surface of the aerogel composite, the number of pores having a diameter of 10 µm to 5 mm in an area of 1,500 mm² may be 10 or less, 5 or less, 3 or less, 2 or less, or 1 or less.

As another example, in a cutting surface of the aerogel composite, the number of pores having a diameter of 200 µm to 5 mm in an area of 1,500 mm² may be 5 or less, 4 or less, 3 or less, 2 or less, or 1 or less.

Furthermore, the aerogel composite has relatively low thermal conductivity. For example, the aerogel composite may have a thermal conductivity of 1 W/mK or less, 0.1 W/mK or less, 0.05 W/mK or less, 0.001 W/mK to 0.03 W/mK, 0.01 W/mK to 0.02 W/mK, or 0.012 W/mK to 0.015 W/mK, Hereinafter, a method of manufacturing a high insulation aerogel-impregnated mat according to an embodiment will be specifically described.

Example 1

An E-glass mat was wetted with a 0.5 wt % sulfuric acid solution at 60° C. as a wetting agent and then wound with a 0.5 mm thick polypropylene sheet, as a separator, to prepare a roll mat. The mats in the form of a round roll were charged into a plurality of vessels, and a pressure of the vessel was reduced to 0.01 Torr. A sol of sodium silicate, potassium silicate, or lithium silicate having an adjusted pH of 5, as a precursor, was gradually injected from a bottom of the vessel by a pressure difference. A lower value of the vessel was closed, a vacuum was applied to remove remaining air bubbles at 0.01 Torr for 30 minutes and aging was performed, to prepare a roll mat having a cured hydrogel. After the roll mat was taken out from the vessel and the separator was removed, a salt was removed by washing the roll mat several times with 60° C. hot water. Thereafter, the roll mat was put in a reactor connected to a distillation column, and solvent substitution was performed by adding an organic solvent such as isopropyl alcohol, toluene, and xylene. Also, the roll mat was organically surface modified with a mixture containing trimethylchlorosilane and methyltrimethoxysilane in a weight ratio of 1:0.1, and was then washed with toluene. A final aerogel mat was obtained by drying the washed mat at 80° C. for 60 minutes and then drying at 230° C. for 2 hours. A thermal conductivity of the aerogel mat obtained was 0.015 W/mK.

Example 2

An aerogel mat was manufactured in the same manner as in Example 1 except that wetting was performed by using a 0.5 wt % linear alkylbenzene sulfonate (LAS) as a wetting gent. A thermal conductivity of the aerogel mat was 0.012 W/mK.

Example 3

Wetting was performed on a ceramic wool mat by injecting ethanol while transporting the ceramic wool mat by a roller, and a residual solvent was absorbed and removed. The wetted mat was wound with a stainless steel sheet, as a separator, in multiple layers to prepare a roll mat. The wetted roll mats were charged into a plurality of injection aging vessels, and an internal pressure of each vessel was reduced to 0.01 Torr. A sol of sodium silicate having an adjusted pH of 5, as a precursor, was gradually injected from a bottom of the vessel by a pressure difference. A lower value of the vessel was closed and a vacuum was applied to remove remaining air bubbles at 0.01 Torr for 30 minutes. Thereafter, a roll mat having a hydrogel was manufactured by curing the roll mat at 60° C. for 4 hours. After the roll mat was taken out from the vessel and the separator was removed, a salt was removed by ultrasonically cleaning the roll mat several times with 60° C. hot water. Thereafter, the roll mat was put in a reactor connected to a distillation column, and solvent substitution was performed by adding an organic solvent such as acetone, isopropyl alcohol, butanol, and xylene. Also, the roll mat was organically surface modified with a mixture containing hexamethyldisilazane and methyltrimethoxysilane in a weight ratio of 1:0.1, and was then washed with isopropyl alcohol. A final aerogel mat was obtained by drying the washed mat at 80° C. and then drying at 230° C. for 2 hours. A thermal conductivity of the aerogel mat obtained was 0.014 W/mK.

Cross-Sectional Evaluation

Figure 4:
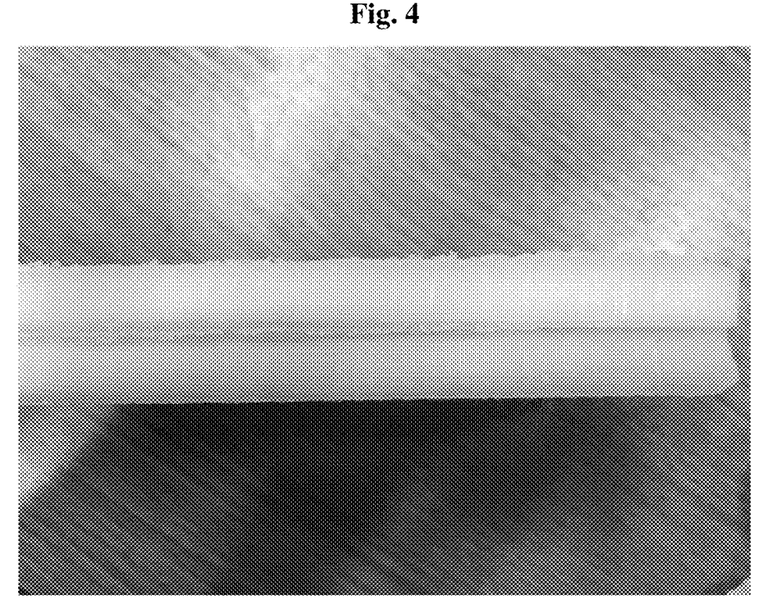
FIG. 4 is a cross-sectional image of an aerogel composite according to an embodiment.

A cross section was visually observed by cutting the aerogel composite prepared in Example 1. As a result, pores having a diameter of about 200 µm to about 5 mm were not observed in an area of 1,500 mm² as illustrated in FIG. 4. Also, as a result of observing the cross section with an optical microscope, pores having a diameter of about 10 µm to about 200 µm were not observed in the area of 1,500 mm².

Figure 5:
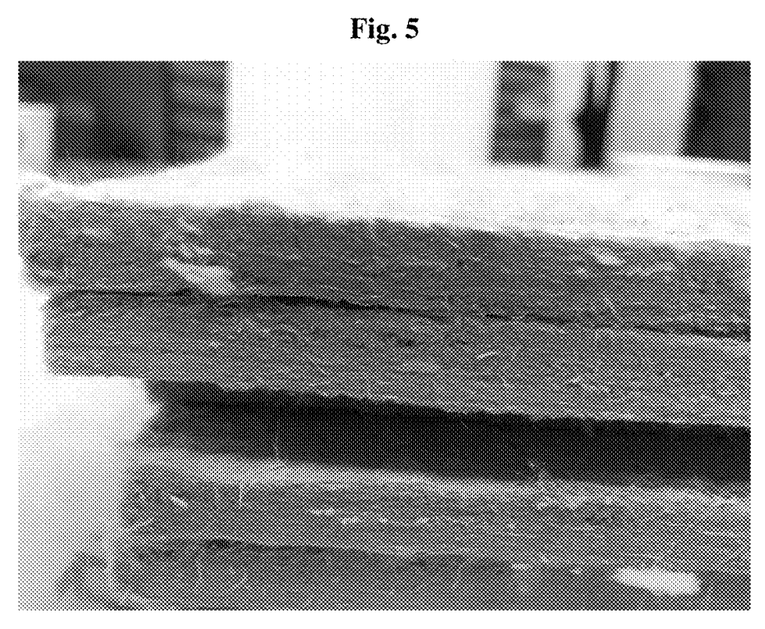
FIG. 5 is a cross-sectional image of a conventional aerogel composite for comparison.

Furthermore, for comparison, a cross section was visually observed by cutting a commercial product manufactured by Aspen Aerogels, Inc. As a result, 10 or more of pores having a diameter of 200 µm to 5 mm were observed in an area of 1,500 mm² as illustrated in FIG. 5.

The invention claimed is:

1. A method of preparing an aerogel composite, the method comprising:
    wetting a fibrous material including at least one of inorganic fibers and organic fibers;
    winding the wetted fibrous material with a separator in a roll form or laminating the wetted fibrous material with the separator in a planar form;
    charging the fibrous material into a vessel;
    preparing a gel-fiber composite by injecting a precursor into the vessel and gelating the precursor while removing residual air bubbles under vacuum;
    taking out the gel-fiber composite from the vessel and removing the separator;
    solvent substituting and organically surface-modifying the gel-fiber composite; and
    atmospheric pressure drying the organically surface-modified gel-fiber composite,
    wherein the organic surface modification is performed by using a mixture of silane and alkoxysilane as a treatment agent,
    wherein a mixing ratio by weight of the silane to the alkoxysilane is in a range of 1:0.01 to 1:0.3, and
    wherein the treatment agent for the organic surface modification further includes an opacifying agent selected from the group consisting of $Al_2O_3$, $Fe_2O_3$, $TiO_2$, Carbon, graphite, SiC, a boron compound, and a mixture thereof.

2. The method of claim 1, wherein the inorganic fibers comprise at least one selected from the group consisting of glass fibers, glass wool, rock wool, ceramic wool, and boron fibers; and
    the organic fibers comprise at least one selected from the group consisting of nylon, aramid fibers, carbon fibers, polypropylene fibers, polyethylene fibers, polyester fibers, polyurethane fibers, acrylic fibers, polyvinyl chloride acetate fibers, rayon fibers, regenerated fibers, and waste fibers.

3. The method of claim 1, wherein the wetting is performed by using at least one wetting agent selected from:
- (i) at least one acid selected from the group consisting of sulfuric acid, nitric acid, hydrochloric acid, acetic acid, and hydrofluoric acid in a pH range of 1 to 5;
- (ii) at least one water-soluble solvent selected from the group consisting of C1-C4 alcohol, acetone, ethylene glycol, glycol ethers, dimethylformamide (DMF), and tetrahydrofuran (THF); and
- (iii) at least one surfactant selected from the group consisting of sodium fatty acid, sodium alkylbenzenesulfonic acid, linear alkylbenzene sulfonate (LAS), polyacrylamide, polyoxyethylene alkylamine, dialkyldimethyl ammonium salt, alkylbenzylmethyl ammonium salt, polyoxyethylene alkyl ether, fatty acid sorbitan ester, fatty acid diethanolamine, alkylmonoglyceryl ether, alkyl sulfobetaine, and alkyl carboxybetaine.

4. The method of claim 1, wherein the separator is formed by treating a material, which is selected from the group consisting of stainless steel, a rubber membrane, a magnesium sheet, an aluminum sheet, polyvinyl chloride (PVC), polyethylene (PE), polyester, polypropylene (PP), polystyrene (PS), nylon, and a mixture material thereof, to allow a fluid to penetrate and permeate thereinto.

5. The method of claim 1, wherein the precursor is a sol of sodium silicate, potassium silicate, or lithium silicate in a pH range of 3 to 7, or is tetraethoxysilane hydrolyzed by an acid catalyst.

6. A method of preparing an aerogel composite, the method comprising:
- providing a fibrous material including at least one of inorganic fibers and organic fibers;
- wetting the fibrous material;
- charging the wetted fibrous material into a vessel;
- impregnating the fibrous material with a precursor by injecting the precursor into the vessel after reducing a pressure in the vessel;
- preparing a gel-fiber composite by gelation of the precursor;
- substituting a solvent included in a gel of the gel-fiber composite and organically modifying an inner surface of the gel; and
- atmospheric pressure drying the gel-fiber composite,
- wherein the organic modification of inner surface of the gel is performed by using a mixture of silane and alkoxysilane as a treatment agent,
- wherein a mixing ratio by weight of the silane to the alkoxysilane is in a range of 1:0.01 to 1:0.3, and
- wherein the treatment agent for the organic surface modification further includes an opacifying agent selected from the group consisting of $Al_2O_3$, $Fe_2O_3$, $TiO_2$, Carbon, graphite, SiC, a boron compound, and a mixture thereof.

7. The method of claim 6, wherein a separator is inserted into the wetted fibrous material before the wetted fibrous material is charged into the vessel, and
the separator is removed after the gel-fiber composite is prepared.

8. The method of claim 7, wherein the separator is wound with the wetted fibrous material in a roll form.

9. The method of claim 7, wherein the separator and the wetted fibrous material are alternately stacked.

10. The method of claim 6, wherein the solvent comprises water.

11. The method of claim 10, wherein, before the fibrous material is impregnated with the precursor, a pressure in the vessel is reduced to a range of 0.001 Torr to 10 Torr.

12. The method of claim 6, further comprising reducing a pressure in the vessel after the fibrous material is impregnated with the precursor.

13. The method of claim 12, wherein, after the fibrous material is impregnated with the precursor, the pressure in the vessel is reduced to a range of 0.001 Torr to 10 Torr.

14. An aerogel composite comprising:
- a fibrous material including at least one of inorganic fibers and organic fibers; and
- an aerogel disposed in the fibrous material,
- wherein, in a cutting surface of the aerogel composite, the number of pores having a diameter of 10 μm to 5 mm in an area of 1,500 $mm^2$ is 10 or less,
- wherein, after the sol of the sodium silicate, potassium silicate, or lithium silicate is impregnated into the fibrous material under vacuum and gelated, the aerogel is prepared by solvent substitution and organic modification of an inner surface of the gel, and
- wherein the organic modification of an inner surface of the gel is performed by using a mixture of silane and alkoxysilane as a treatment agent,
- wherein a mixing ratio by weight of the silane to the alkoxysilane is in a range of 1:0.01 to 1:0.3, and
- wherein the treatment agent for the organic surface modification further includes an opacifying agent selected from the group consisting of $Al_2O_3$, $Fe_2O_3$, $TiO_2$, Carbon, graphite, SiC, a boron compound, and a mixture thereof.

15. The aerogel composite of claim 14, wherein the aerogel is formed from a sol of sodium silicate, potassium silicate, or lithium silicate.

16. The aerogel composite of claim 14, wherein the number of the pores is 5 or less.

17. The aerogel composite of claim 14, wherein the number of the pores is 3 or less.

18. The aerogel composite of claim 14, wherein the number of the pores is 2 or less.

* * * * *